Dec. 27, 1938. H. HERMANN 2,141,865
SWIVEL
Filed June 30, 1937
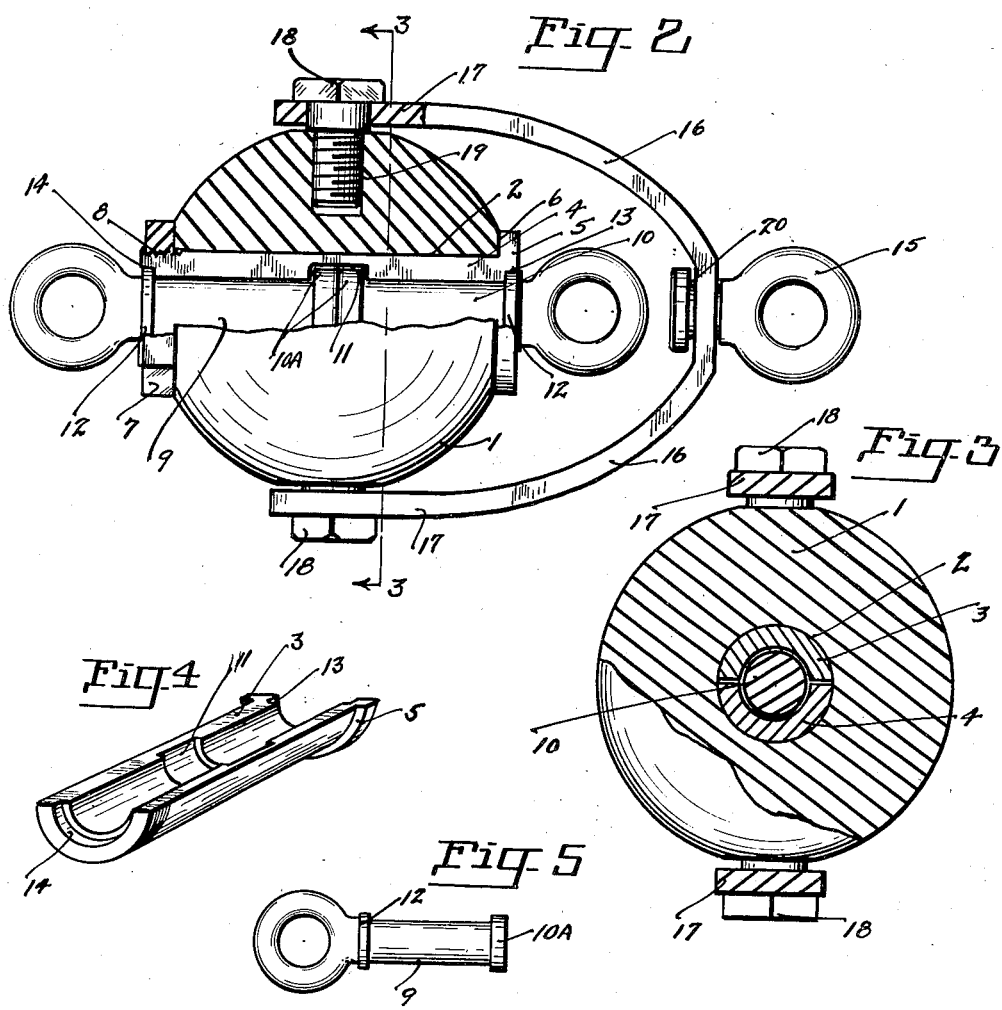
INVENTOR
Henry Hermann Patented Dec. 27, 1938

2,141,865

UNITED STATES PATENT OFFICE 2,141,865

SWIVEL

Henry Hermann, Myrtle Point, Oreg.

Application June 30, 1937, Serial No. 151,201

6 Claims. (Cl. 59—95)

This invention relates to swivels and is particularly adapted to be used in connection with cables as used in the logging operations, for instance on the cable used for hauling in the logs commonly called a drag-line, provision is also made for connecting the haul back line and the choker line.

The primary object of the invention is to permit the revolving of the lines freely at a point where it intersects such as where the choker cable is connected between the drag line and the haul back line. Heretofore if the cable became twisted there was no way of automatically relieving the twist but in my new and improved swivel joint the cables are always free to align themselves in their natural straight line position.

Another object of my invention is to eliminate all link connections as heretofore used in cable riggings, the cable is directly connected to the swivel itself.

A further object of my invention is to provide a double swivel within one body portion.

Another object of the invention is to provide a swivel where all parts can be replaced and are independent of one another.

Another object of the invention is to provide a simple and inexpensive swivel for joining more than one line together as used in cable rigging.

These and further objects will be apparent in the following specification and claims.

Referring to the drawing:

Figure 1 shows my new invention as connected to a drag line haul, back line and choker cable.

Figure 2 is a side elevation, partially in section of my new and improved swivel.

Figure 3 is an end view, partially broken away, taken on line 3—3 of Figure 2, looking in the direction indicated.

Figure 4 is a detail view of the split sleeve retainer removed from the swivel.

Figure 5 is a side view of one of the swivel eyes removed from the swivel.

In the drawing:

1 is the main body portion of the swivel, having a transverse opening 2 through its center. This opening receives the split sleeves 3 and 4. The sleeves 3 and 4 have a shoulder 5 on their one end for engaging the surface 6 of the body portion. The sleeves are retained and locked in position by the lock nut 7, threaded to the sleeves at 8. Before the sleeves 3 and 4 are inserted within the body portion the eye bolt swivels 9 and 10 are placed between the two sleeves. The ends of the eye bolts have shoulders 10A for engaging within the groove 11 of the sleeves 3 and 4.

These shoulders take the strain of the eye bolts and work freely within the groove 11. Shoulders 12 are also provided for engaging the grooves 13 and 14 of the sleeves retaining the swivel in a relative fixed position. When the eye bolts 9 and 10 are placed between the sleeves 3 and 4 the whole assembly is inserted through the opening 2 of the body portion 1 after which the lock nut 7 is threaded upon the sleeve and cinched up tight. This brings the whole assembly together in working position permitting the swivels to revolve freely within the sleeves while the sleeves themselves are locked solidly within the body portion 1.

A bail swivel 15 is connected to the body portion 1 by the bail 16 having its ends 17 pivotally mounted to the shoulder bolts 18. The shoulder bolts 18 are securely cinched within the threaded portion 19 of the body providing a bearing for the bail 16 to revolve about. The eye bolt 15 is secured to the bail in the usual manner as shown at 20.

Referring to Figure 1, 21 indicates a drag line as used in logging operations being connected to the swivel 9 of the main body portion 1. A haul back line 22 is shown connected to the swivel 10. The choker line is indicated at 23 connected to the swivel 15 of the bail 16. In this construction the lines 21, 22 and 23 are permitted to revolve freely when they become twisted so that they will pull in a straight line natural position.

While this particular form of embodiment is well adapted for the use intended I do not wish to be limited to this particular form of mechanism or construction as other forms of mechanical details may be employed still coming within the scope of the claims to follow.

I claim:

1. A swivel comprising a pair of split sleeves having intermediate recesses, a shoulder at one end and threads at the other, a body provided with a bore to receive the sleeves and a nut threaded to the threaded ends of the sleeves maintaining them in the body, a pair of eye bolts provided with end shoulders seated in the recesses, and a swivel bail pivotally secured to the body.

2. A swivel comprising a pair of split sleeves having intermediate recesses, a shoulder at one end and threads at the other, a body provided with a bore to receive the sleeves and a nut threaded to the threaded ends of the sleeves maintaining them in the body, and a pair of eye bolts provided with end shoulders seated in the recesses in the sleeves.

3. A swivel comprising a pair of split sleeves having intermediate internal seats, a shoulder at one end and threads at the other, a body provided with a bore to receive the sleeves and a nut threaded to the threaded ends of the sleeves maintaining them in the body, and a pair of eye bolts provided with portions seated within the seats of the sleeves.

4. A swivel comprising a pair of eye bolts having holding means at corresponding ends, a pair of members gripping the eye bolts and having portions receiving the holding means and securing them against movement from one another, an outer member within which the members are seated securing the members in co-operative relationship with one another, and swivel means connected to the outer member.

5. In a swivel, a pair of eye bolts and means for holding them rotatively end to end, a member interiorly supporting and securing the means in place, and a swivel having its ends swivelly connected to the member.

6. A swivel comprising a pair of eye bolts having holding means at corresponding ends, a pair of members gripping the eye bolts and having portions receiving the holding means and securing them against movement from one another, an outer member within which the members are seated securing the members in co-operative relationship with one another, and a bail having its ends pivotally secured to opposite sides of the outer member.

HENRY HERMANN.